(12) United States Patent
Lin et al.

(10) Patent No.: US 8,387,474 B2
(45) Date of Patent: Mar. 5, 2013

(54) LUBRICATING DEVICE FOR MOTION GUIDE APPARATUS

(75) Inventors: Ming Yao Lin, Taichung (TW); Chia Min Liu, Taichung (TW); Chun Lin Yu, Taichung (TW); Yu Shan Lee, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 381 days.

(21) Appl. No.: 12/454,725

(22) Filed: May 21, 2009

(65) Prior Publication Data
US 2010/0294056 A1 Nov. 25, 2010

(51) Int. Cl.
*F16H 25/24* (2006.01)
(52) U.S. Cl. .......................... 74/89.43; 74/89.44; 74/467
(58) Field of Classification Search ................. 74/89.43, 74/89.44, 467; 184/6.8, 6.15, 6.17, 7.1, 19, 184/20; 384/369, 474, 475
See application file for complete search history.

(56) References Cited

U.S. PATENT DOCUMENTS

| 477,422 | A | * | 6/1892 | Kellom | 184/17 |
| 2,167,640 | A | * | 8/1939 | Cope | 184/109 |
| 2,910,043 | A | * | 10/1959 | Borden | 118/234 |
| 3,132,719 | A | * | 5/1964 | Cole | 184/65 |
| 5,168,767 | A | * | 12/1992 | Morita | 74/89.44 |
| 5,251,725 | A | * | 10/1993 | Barrett, Jr. | 184/6.14 |
| 5,782,135 | A | | 7/1998 | Kondo et al. | 74/459 |
| 6,015,775 | A | | 1/2000 | Takayama et al. | 508/103 |
| 6,068,931 | A | | 5/2000 | Adam et al. | 428/469 |
| 7,234,368 | B1 | | 6/2007 | Lin et al. | 74/89.44 |

* cited by examiner

*Primary Examiner* — Robert Pezzuto
*Assistant Examiner* — Matthew D Troutman
(74) *Attorney, Agent, or Firm* — Charles E. Baxley (57) ABSTRACT

A motion guide device includes an elongated shaft having a groove formed on an outer peripheral surface, a movable member attached onto the shaft and having a bore for receiving the shaft, a housing attached to the movable member and having a space for receiving a lubricating oil, the housing includes a passage communicative with the bore and the space of the housing for allowing the lubricating oil to flow from the space into the groove of the shaft, and an oil applying member is rotatably engaged in the passage of the housing to carry and to apply or distribute the lubricating oil through the passage of the housing and then into the groove of the elongated shaft.

6 Claims, 12 Drawing Sheets

LUBRICATING DEVICE FOR MOTION GUIDE APPARATUS

BACKGROUND OF THE INVENTION

1. Field of the Invention

The present invention relates to a motion guide apparatus, such as a linear motion guide apparatus or a ball screw device, and more particularly to a motion guide apparatus including two movable members movable relative to each other, and a lubricating device easily attached to one of the two movable members for applying a lubricating grease or oil onto the other movable member and for suitably lubricating the movable members.

2. Description of the Prior Art

Typical motion guide apparatuses, such as the linear motion guide apparatuses or the ball screw devices comprise two movable members rotatable or movable relative to each other, and a number of ball bearing elements disposed between the two movable members for facilitating the sliding movement between the two movable members.

For example, U.S. Pat. No. 5,782,135 to Kondo et al. discloses one of the typical ball screw devices comprising a ball nut pivotally or rotatably coupled onto a screw shaft, and a number of loaded ball bearing elements disposed between the screw shaft and the ball nut for facilitating the sliding movement between the screw shaft and the ball nut, and a number of non-loaded balls disposed between the loaded ball bearing elements and made of lubricating materials for suitably lubricating the loaded ball bearing elements and the screw shaft and the ball nut.

However, after use, the non-loaded balls will be worn out and will have a reduced outer diameter such that the gaps between the loaded ball bearing elements will be greatly increased and such that the screw shaft and the ball nut may not be suitably pivoted or rotated relative to each other.

U.S. Pat. No. 6,015,775 to Takayama et al., and U.S. Pat. No. 6,068,931 to Adam et al. disclose two further typical self-lubricating sliding or bearing materials made of specially designed or selected elements for suitably lubricating two movable or rotatable or slidable members.

However, the specially designed or selected elements may greatly increase the manufacturing costs for the sliding or bearing materials.

U.S. Pat. No. 7,234,368 to Lin et al. discloses a further typical ball screw device comprising a ball nut pivotally or rotatably coupled onto a screw shaft, and a number of ball bearing elements disposed between the screw shaft and the ball nut for facilitating the sliding movement between the screw shaft and the ball nut, and one or more guide members engaged in the helical groove portions of the screw shaft and each having an oil retaining member for applying the oil onto the screw shaft.

However, the ball nut should be specially designed and machined for fitting or mounting the guide members such that the manufacturing procedures for the typical ball screw device will be complicated and such that the manufacturing costs for the typical ball screw device will be greatly increased.

The present invention has arisen to mitigate and/or obviate the afore-described disadvantages of the conventional motion guide apparatuses.

SUMMARY OF THE INVENTION

The primary objective of the present invention is to provide a motion guide apparatus including two movable members movable relative to each other, and a lubricating device easily attached to one of the two movable members for applying a lubricating grease or oil onto the other movable member and for suitably lubricating the movable members.

In accordance with one aspect of the invention, there is provided a motion guide apparatus comprising an elongated shaft including a groove formed on an outer peripheral surface thereof, a movable member movably attached onto the elongated shaft, and including a bore formed therein for receiving the elongated shaft, a housing attached to the movable member and moved in concert with the movable member, and including a space formed therein for receiving a lubricating oil, and including a passage formed therein and communicative with the bore and the space of the housing for allowing the lubricating oil to flow from the space into the bore of the housing and then into the groove of the elongated shaft, and an oil applying member rotatably engaged in the passage of the housing and rotatable relative to the housing to carry and to apply the lubricating oil through the passage of the housing and then into the groove of the elongated shaft.

The housing includes an orifice formed therein, and the oil applying member includes an axle rotatably received and engaged in the orifice of the housing.

The housing includes a cover secured to the housing and having an opening formed in the cover and aligned with the passage of the housing for rotatably receiving and engaging with the oil applying member.

The oil applying member includes a wheel rim having an outer diameter arranged for engaging with the outer peripheral surface of the elongated shaft and for allowing the oil applying member to be forced to rotate relative to the housing by the contact or engagement between the elongated shaft and the wheel rim of the oil applying member.

The oil applying member includes an engaging rim having an outer diameter greater than that of the wheel rim for engaging into the groove of the elongated shaft and for carrying and applying or distributing the lubricating oil into the groove of the elongated shaft.

The housing includes a plunger slidably received and engaged in the space of the housing for separating the space of the housing into a compressing chamber and a compartment and for forcing the lubricating oil that is received in the chamber of the housing to flow through the passage of the housing.

The housing includes at least one pole disposed and mounted in the space of the housing, and the plunger is slidably attached onto the pole. The housing includes at least one spring member engaged with the plunger for biasing and forcing the plunger to force the lubricating oil into the passage of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
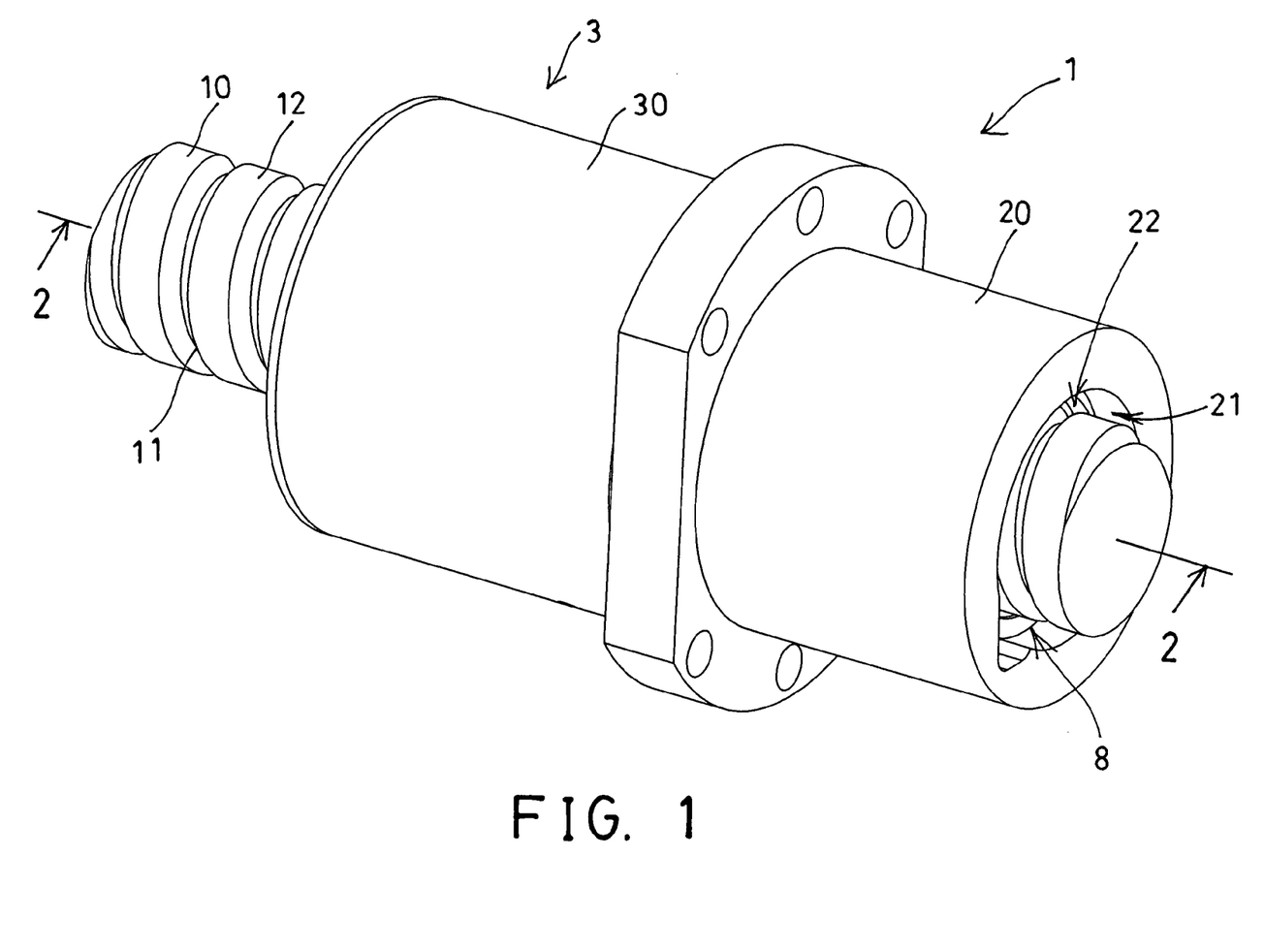
FIG. 1 is a partial perspective view of a motion guide apparatus in accordance with the present invention.
Figure 2:
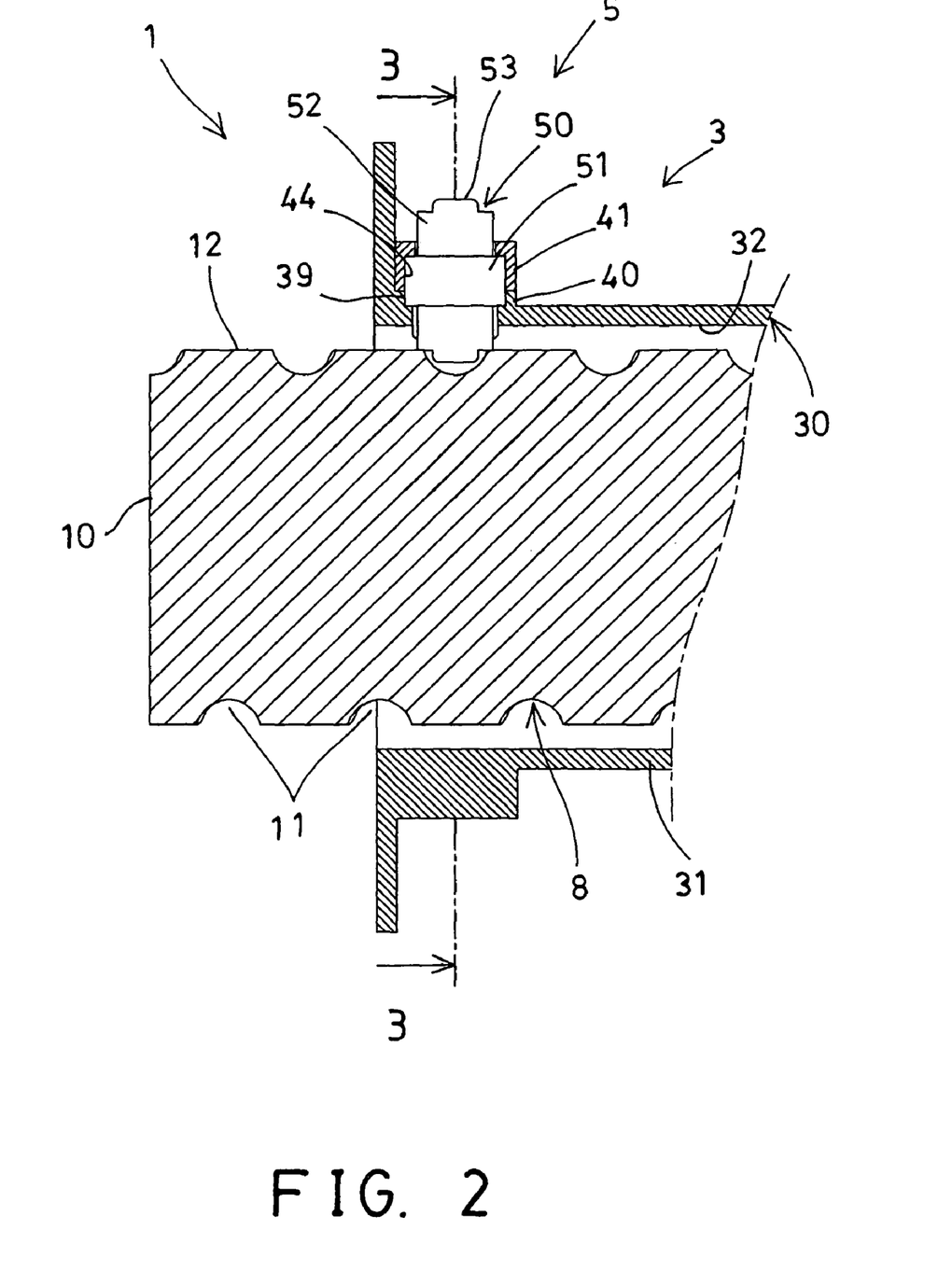
FIG. 2 is a partial cross sectional view of the motion guide apparatus taken along lines 2-2 of FIG. 1.
Figure 3:
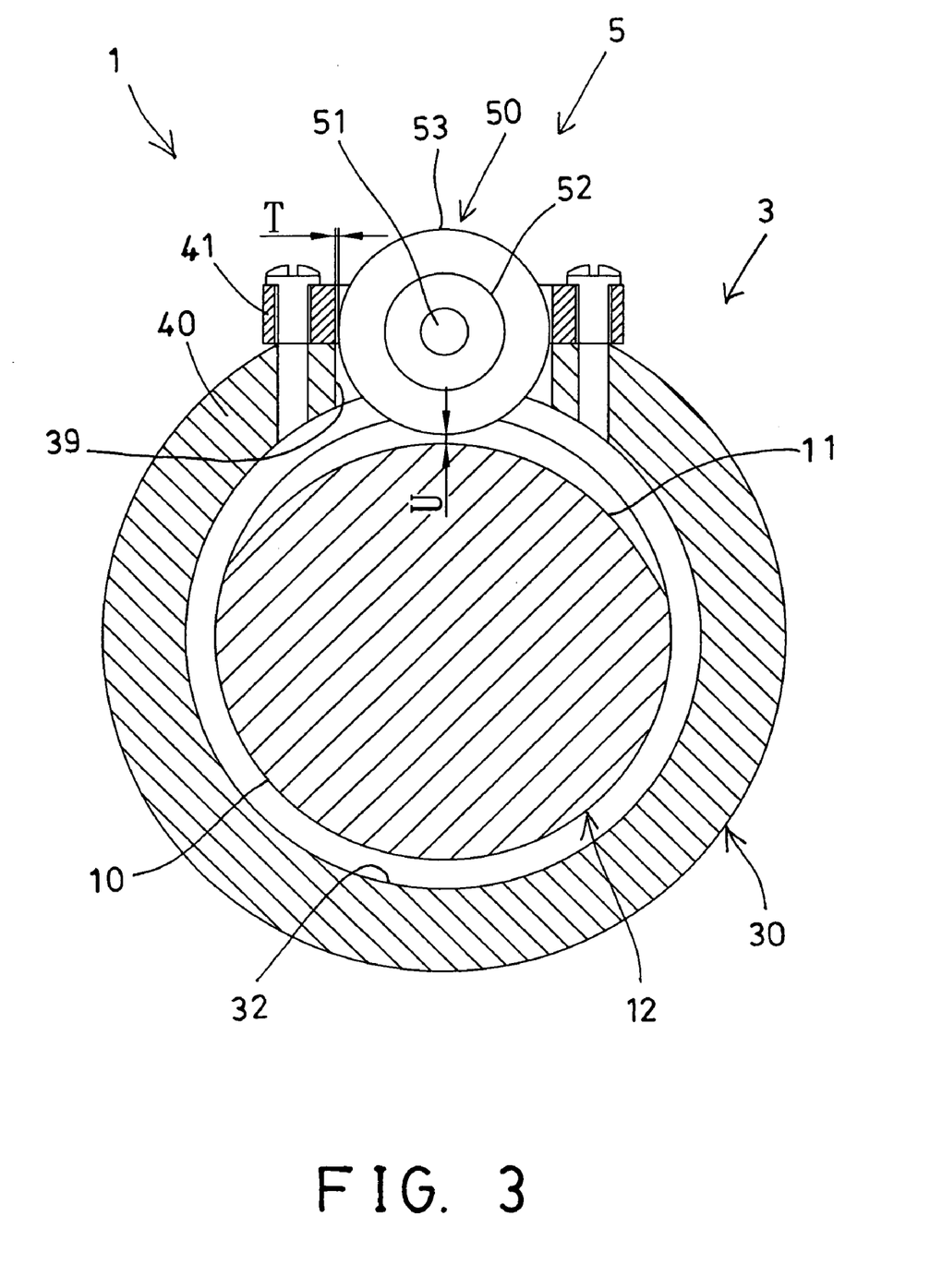
FIG. 3 is a cross sectional view of the motion guide apparatus taken along lines 3-3 of FIG. 2.

Referring to the drawings, and initially to FIGS. 1-3, a motion guide apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole 21 formed therein and formed or defined by a number of helical threaded portions or grooves 22 for receiving or engaging with the elongated screw shaft 10, and for threading or engaging with the helical threaded portions or grooves 11 of the screw shaft 10, and for forming one or more endless ball guiding passages 8 in the ball screw device 1 or between the screw shaft 10 and the ball nut 20 and for slidably receiving a number of ball bearing members (not shown). The above-described structure is typical and will not be described in further details.

Figure 4:
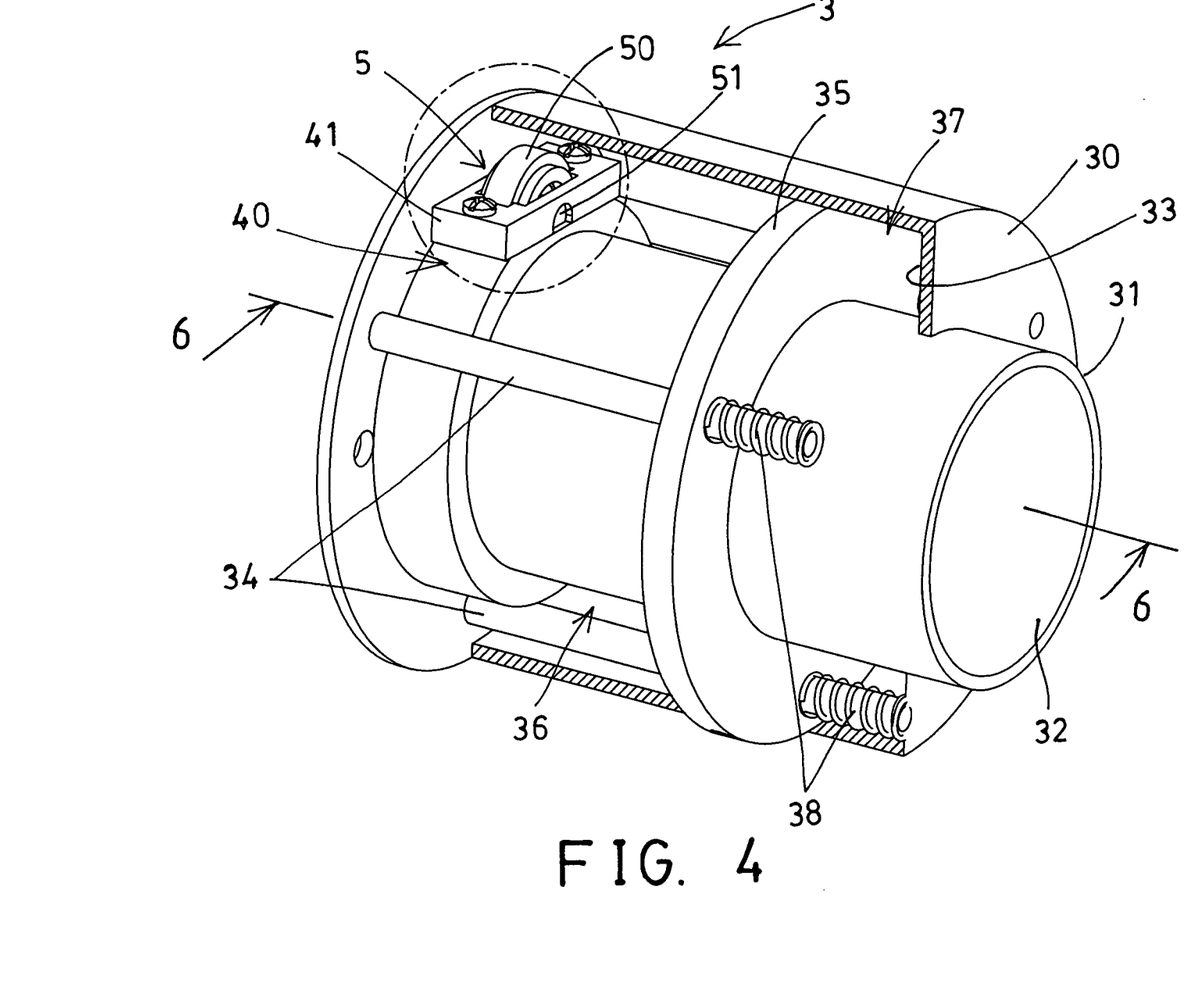
FIG. 4 is a perspective view of a lubricating device for the motion guide apparatus.
Figure 5:
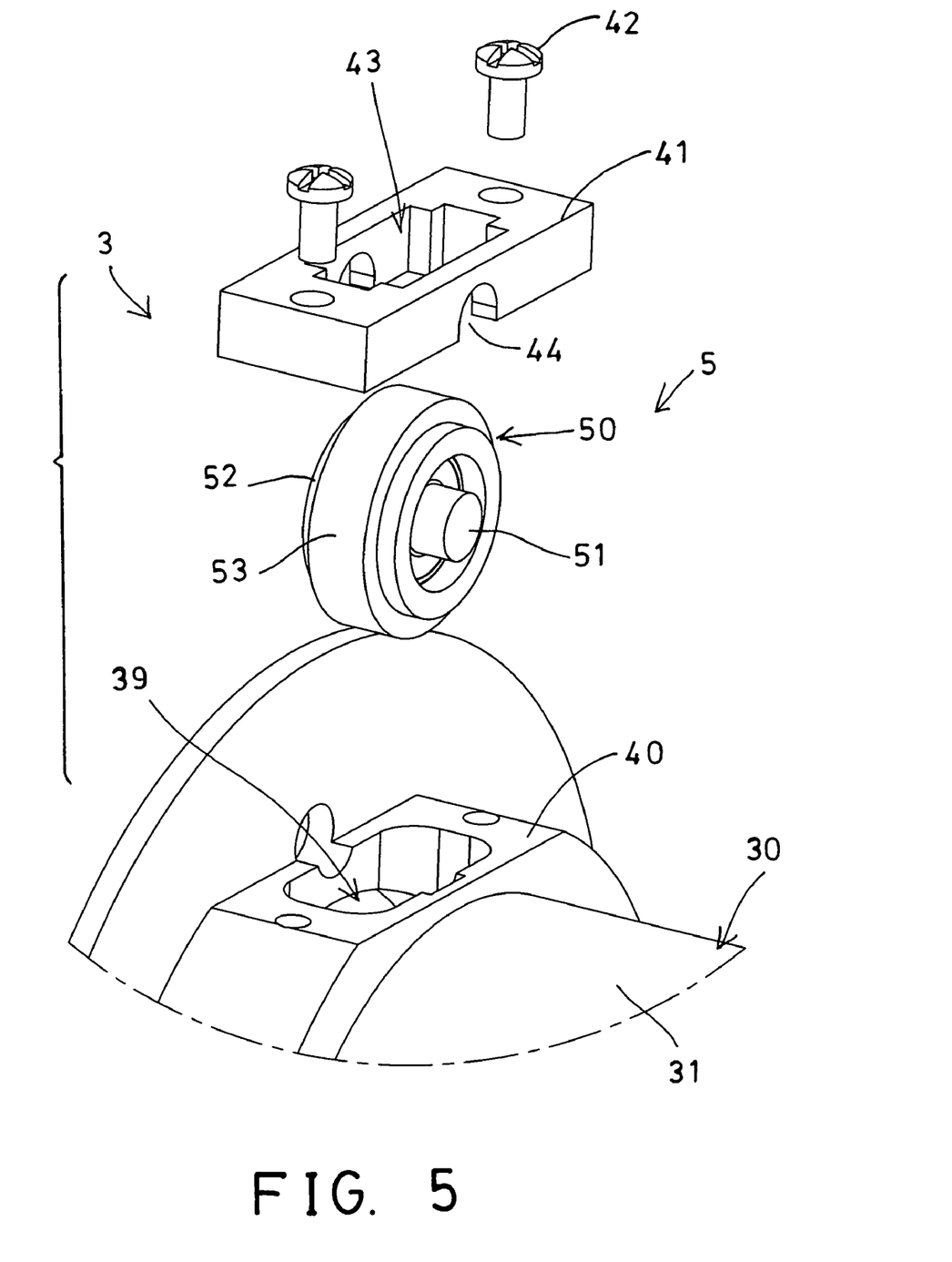
FIG. 5 is a partial exploded view of the lubricating device for the motion guide apparatus.
Figure 6:
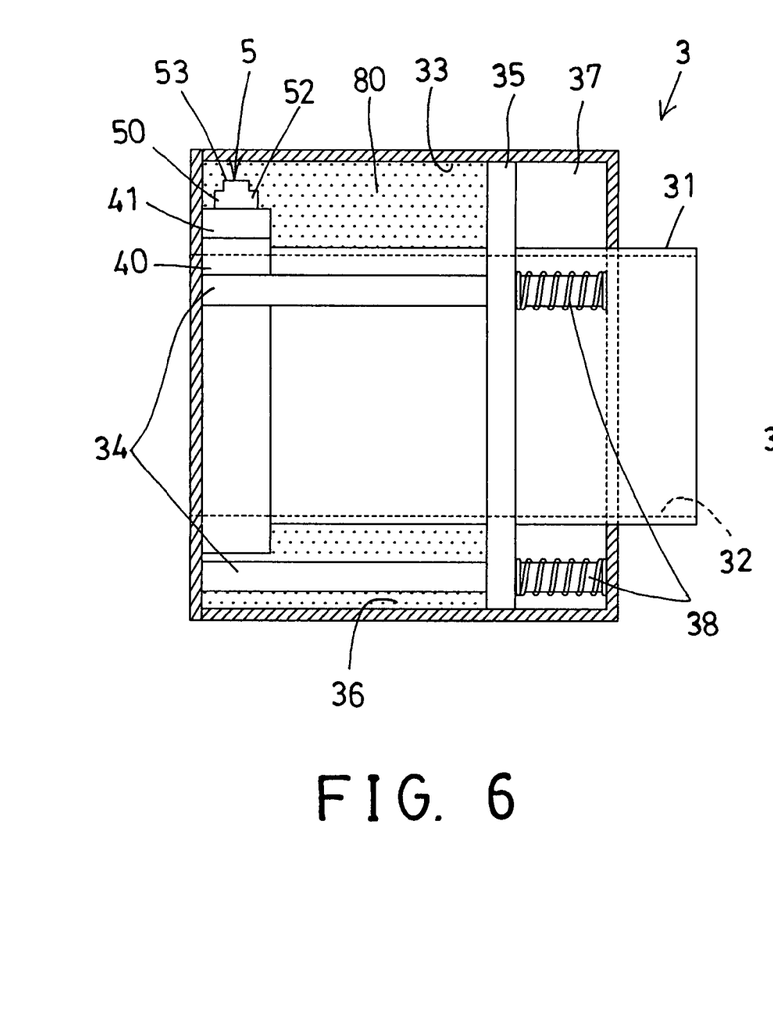
FIG. 6 is a partial cross sectional view taken along lines 6-6 of FIG. 4.
Figure 7:
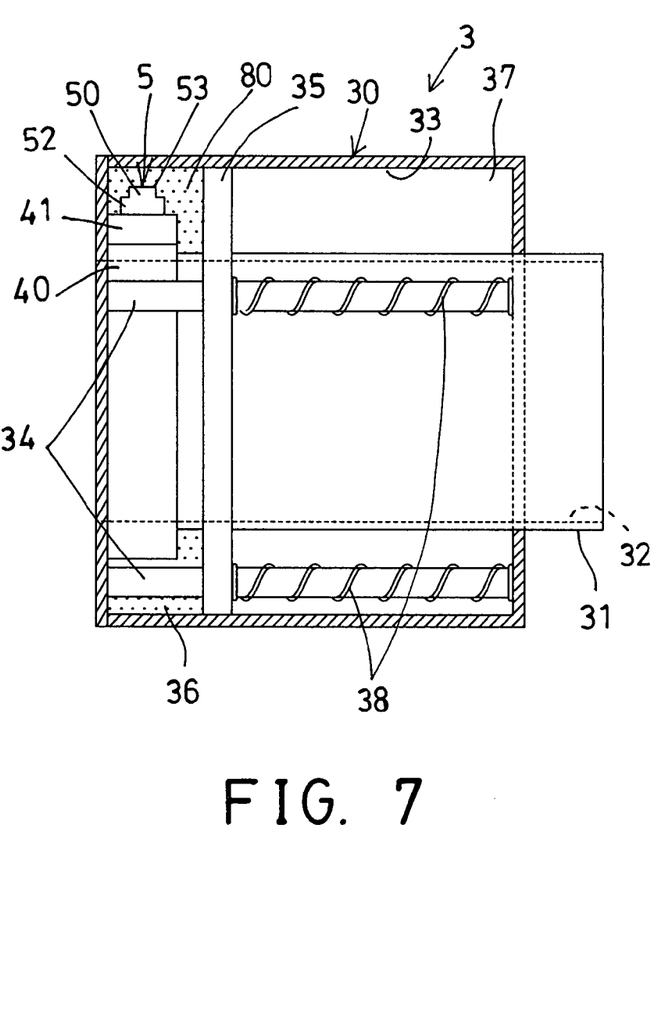
FIG. 7 is a partial cross sectional view similar to FIG. 6, illustrating the operation of the lubricating device for the motion guide apparatus.
Figure 8:
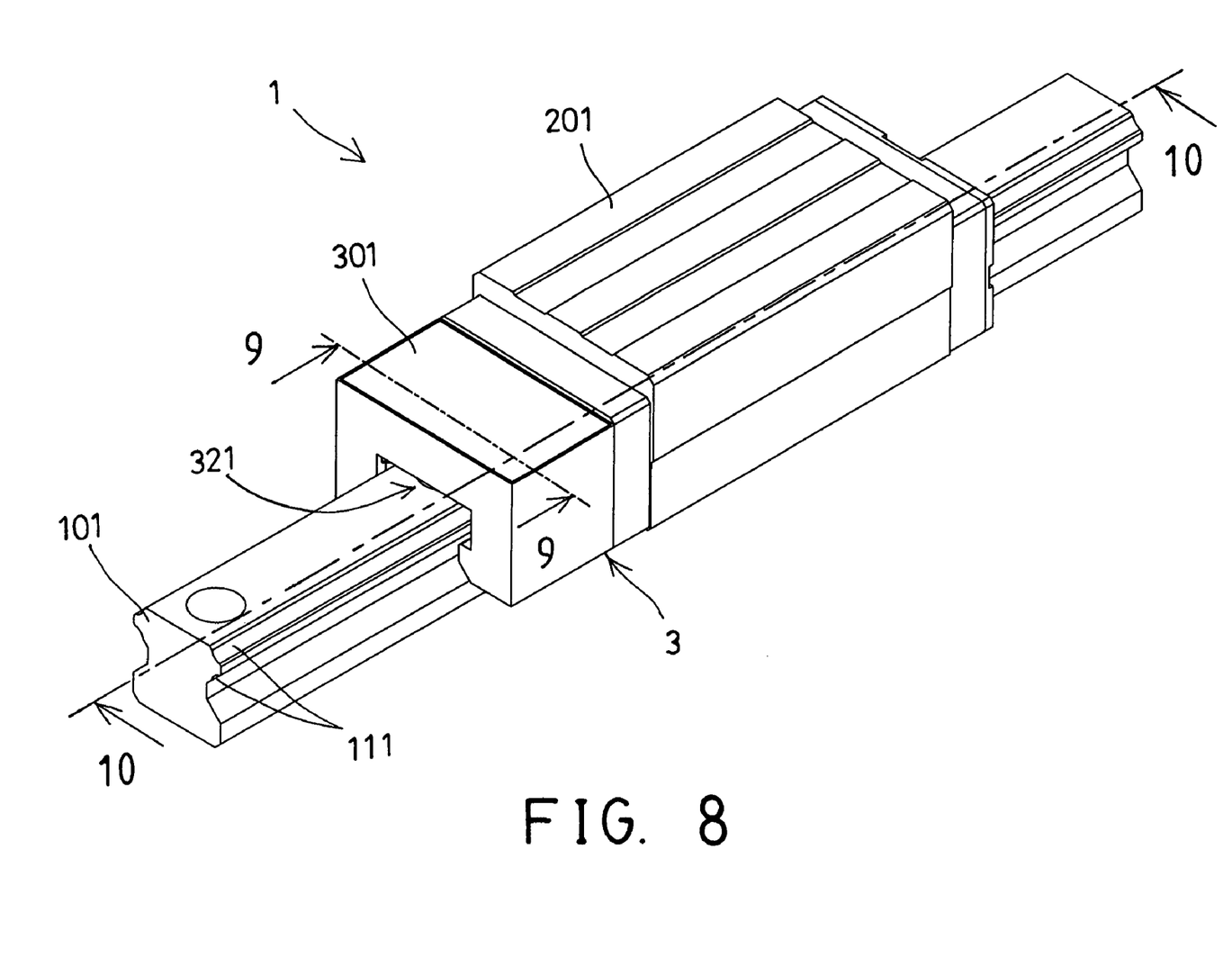
FIG. 8 is a partial perspective view illustrating the other arrangement of the motion guide apparatus.

The motion guide apparatus 1 in accordance with the present invention further comprises a lubricating device 3 including an outer housing 30 and including an inner cylindrical barrel 31 having a bore 32 formed therein for receiving or engaging with the elongated screw shaft 10, and for allowing the lubricating device 3 to be attached or disposed on the outer peripheral portion of the screw shaft 10, and for forming a peripheral space 33 between the housing 30 and the barrel 31, the housing 30 and/or the barrel 31 of the lubricating device 3 may be attached or mounted or secured to the ball nut 20 with latches or fasteners (not shown), adhesive materials or welding procedures, and rotated in concert with the ball nut 20, one or more (such as three) poles 34 are disposed or attached or mounted in the peripheral space 33 of the housing 30 and located between the housing 30 and the barrel 31, and parallel to the housing 30 and the barrel 31, a partition or plunger 35 is slidably received or engaged in the peripheral space 33 of the housing 30 (FIGS. 4, 6, 7) and slidably attached or engaged with the poles 34 for separating the peripheral space 33 of the housing 30 into a compressing chamber 36 and a compartment 37, in which the chamber 36 is provided for receiving the lubricating grease or oil 80 (FIGS. 6, 7).

The lubricating device 3 includes an oil applying or distributing device 5 disposed or mounted in the compressing chamber 36 of the housing 30 for applying or distributing the lubricating grease or oil 80 into the helical threaded portions or grooves 11 of the screw shaft 10 (FIGS. 2, 3). In operation, as shown in FIGS. 6 and 7, the plunger 35 may be moved relative to the housing 30 and the barrel 31 to force the lubricating grease or oil 80 into the oil distributing device 5 and thus to apply or distribute the lubricating grease or oil 80 into the helical threaded portions or grooves 11 of the screw shaft 10. One or more spring members 38 may further be provided and engaged with the poles 34 respectively and engaged with the plunger 35 for biasing or forcing the plunger 35 to force the lubricating grease or oil 80 into the oil distributing device 5.

As shown in FIGS. 2-5, the housing 30 includes a passage 39 formed therein, such as formed in the barrel 31 and communicative with the bore 32 of the barrel 31 or of the housing 30 and the compressing chamber 36 of the space 33 of the housing 30 for allowing the lubricating grease or oil 80 to flow from the compressing chamber 36 of the space 33 of the housing 30 into the bore 32 of the barrel 31 and then into the helical threaded portions or grooves 11 of the screw shaft 10. The oil distributing device 5 includes a wheel or rotary member or oil applying member 50 pivotally or rotatably coupled or engaged within the passage 39 of the housing 30 with an axle 51 and rotatable relative to the housing 30 and the barrel 31 to carry and to apply or to distribute the lubricating grease or oil 80 through the passage 39 of the housing 30 and then into the helical threaded portions or grooves 11 of the screw shaft 10.

For example, the housing 30 includes a peripheral bulge or seat 40 formed or provided thereon and having the passage 39 formed in the seat 40 for rotatably receiving or engaging or mounting the oil applying member 50, and a cover 41 is disposed or attached or mounted or secured on the seat 40 with latches or fasteners 42, and includes an opening 43 formed therein and aligned with the passage 39 of the seat 40 or of the housing 30 for rotatably receiving or engaging or mounting the oil applying member 50, and the seat 40 and/or the cover 41 of the housing 30 may include an orifice 44 formed therein for rotatably receiving or engaging or mounting the axle 51 of the oil applying member 50 and for rotatably attaching or mounting the oil applying member 50 to the seat 40 of the housing 30.

The oil applying member 50 includes one or more (such as two) wheel rims 52 formed or provided on the side portions thereof, and includes an outer diameter arranged for engaging with the outer peripheral surface 12 of the screw shaft 10 and for allowing the oil applying member 50 to be forced to rotate relative to the housing 30 by the screw shaft 10, and the oil applying member 50 further includes a protruded or engaging rim 53 having an outer diameter greater than that of the wheel rims 52 for directing toward and for engaging into the grooves 11 of the screw shaft 10 (FIGS. 2, 3) and for carrying and applying or distributing the lubricating grease or oil 80 into the grooves 11 of the screw shaft 10. The outer diameter of the engaging rim 53 of the oil applying member 50 is arranged for slightly spacing from the screw shaft 10 and for forming a gap "U" (FIG. 3) between the screw shaft 10 and the engaging rim 53 of the oil applying member 50 and thus for applying or distributing the lubricating grease or oil 80 into the grooves 11 of the screw shaft 10.

As also shown in FIG. 3, the outer diameter of the engaging rim 53 of the oil applying member 50 is also arranged for slightly spacing from the seat 40 and/or the cover 41 of the housing 30 and for forming a slit "T" between the seat 40 and/or the cover 41 of the housing 30 and the engaging rim 53 of the oil applying member 50 and thus for allowing the lubricating grease or oil 80 to be carried and applied or distributed through the slit "T" that is formed between the seat 40 and/or the cover 41 of the housing 30 and the engaging rim 53 of the oil applying member 50 and thus for allowing the lubricating grease or oil 80 to be carried and applied or distributed through the passage 39 of the housing 30 and then filled or applied into the helical threaded portions or grooves 11 of the screw shaft 10.

In operation, as shown in FIGS. 2 and 3, when the ball nut 20 and/or the housing 30 of the lubricating device 3 is rotated relative to the screw shaft 10, the oil applying member 50 may be forced to rotate relative to the housing 30 by the screw shaft 10 by the engagement between the screw shaft 10 and the wheel rims 52 of the oil applying member 50, and the lubricating grease or oil 80 may thus carried and applied or distributed into the grooves 11 of the screw shaft 10 with the engaging rim 53 of the oil applying member 50. It is to be noted that the engagement between the screw shaft 10 and the wheel rims 52 of the oil applying member 50 will not affect the rotational movement between the screw shaft 10 and the ball nut 20. The lubricating device 3 may be easily and readily attached or mounted to the ball nut 20 without changing the structure of the screw shaft 10 and the ball nut 20.

Alternatively, as shown in FIGS. 8-13, the motion guide apparatus 1 also comprises an elongated shaft 101 including one or more grooves 111 formed on the outer peripheral portion thereof, a sliding member 201 slidably attached onto the elongated shaft 101 and movable relative to the elongated shaft 101, and a lubricating device 3 includes an outer housing 301 having a bore 321 formed therein for receiving or engaging with the elongated shaft 101, and mounted or secured to the sliding member 201 and moved in concert with the sliding member 201. The housing 301 includes one or more passages 391 formed therein (FIGS. 9, 13) for rotatably receiving or engaging or mounting the oil applying members 501 with axles 51, and the oil applying members 501 each also include one or more wheel rims 52 having an outer diameter arranged for engaging with the elongated shaft 101 and for allowing the oil applying members 501 to be forced to rotate relative to the housing 301 by the elongated shaft 101.

The oil applying members 501 each further include one or more protruded or engaging rims 53 having an outer diameter greater than that of the wheel rims 52 for engaging into the grooves 111 of the elongated shaft 101 and for carrying and applying or distributing the lubricating grease or oil 80 into the grooves 111 of the elongated shaft 101. The outer diameter of the engaging rim 53 of the oil applying members 501 are arranged for slightly spacing from the elongated shaft 101 and for forming a gap "U" (FIG. 9) between the elongated shaft 101 and the engaging rim 53 of the oil applying member 50 and thus for applying or distributing the lubricating grease or oil 80 into the grooves 11 of the elongated shaft 101.

Figure 9:
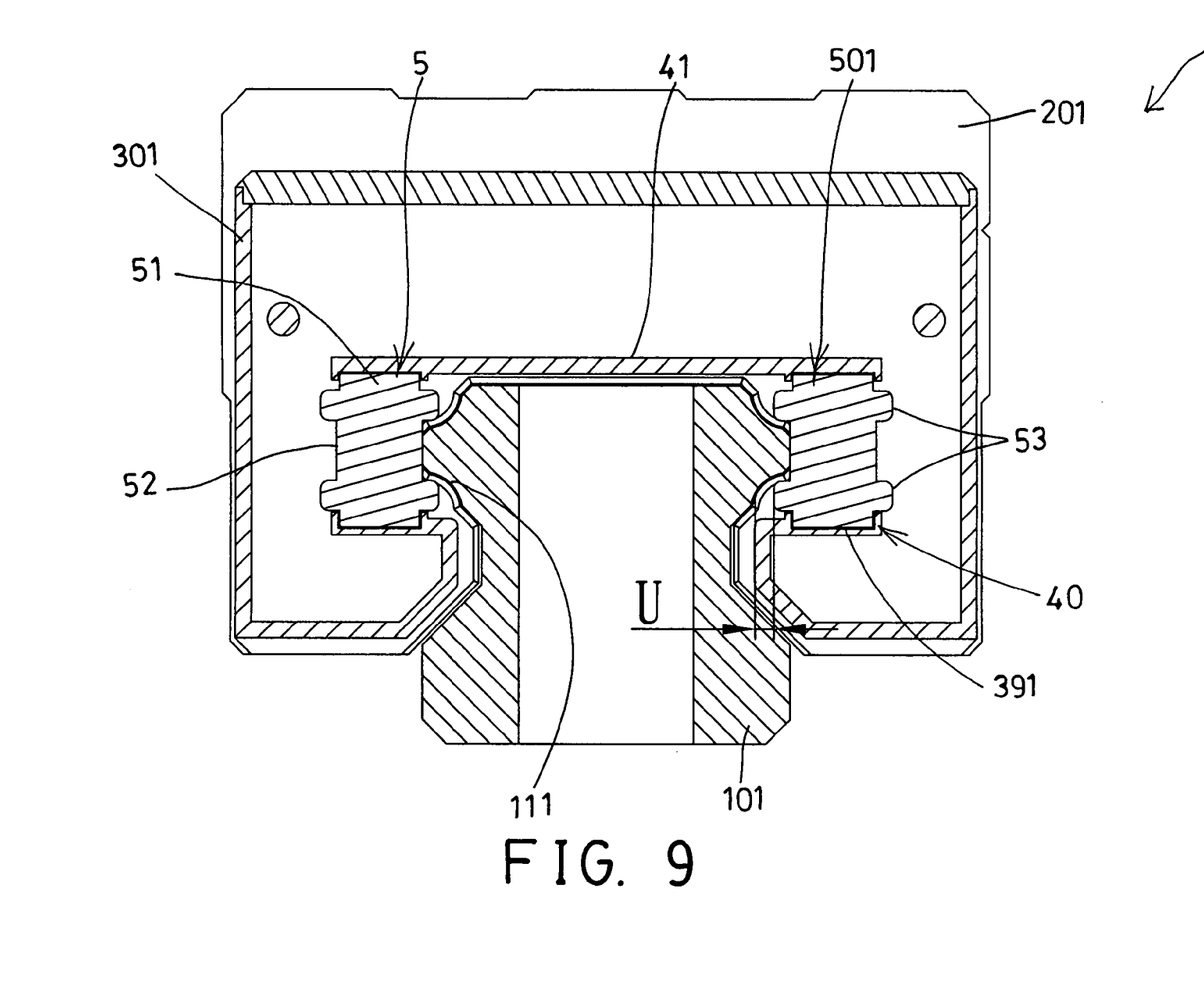
FIG. 9 is a cross sectional view taken along lines 9-9 of FIG. 8.
Figure 10:
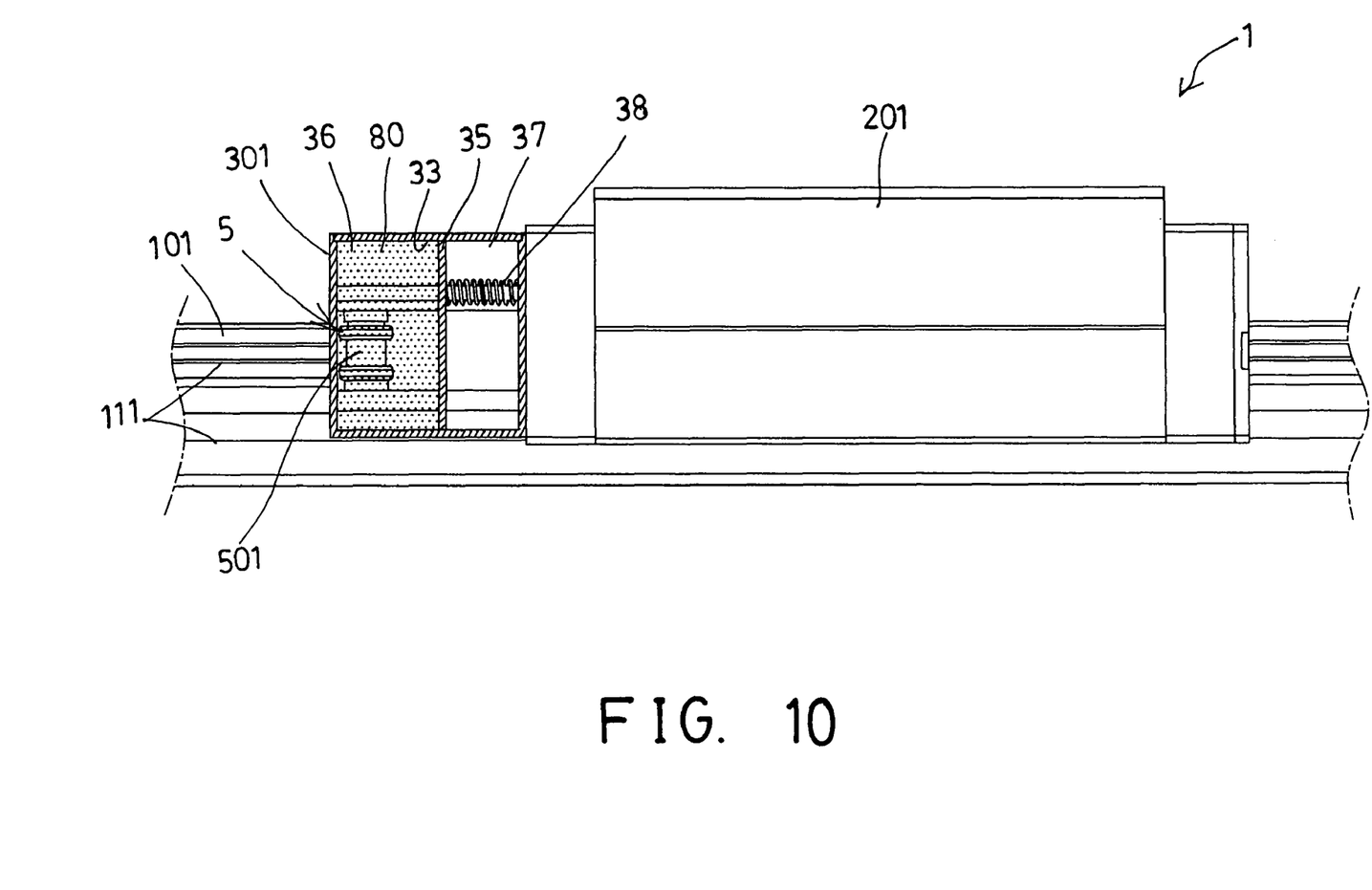
FIG. 10 is a partial cross sectional view taken along lines 10-10 of FIG. 8.
Figure 11:
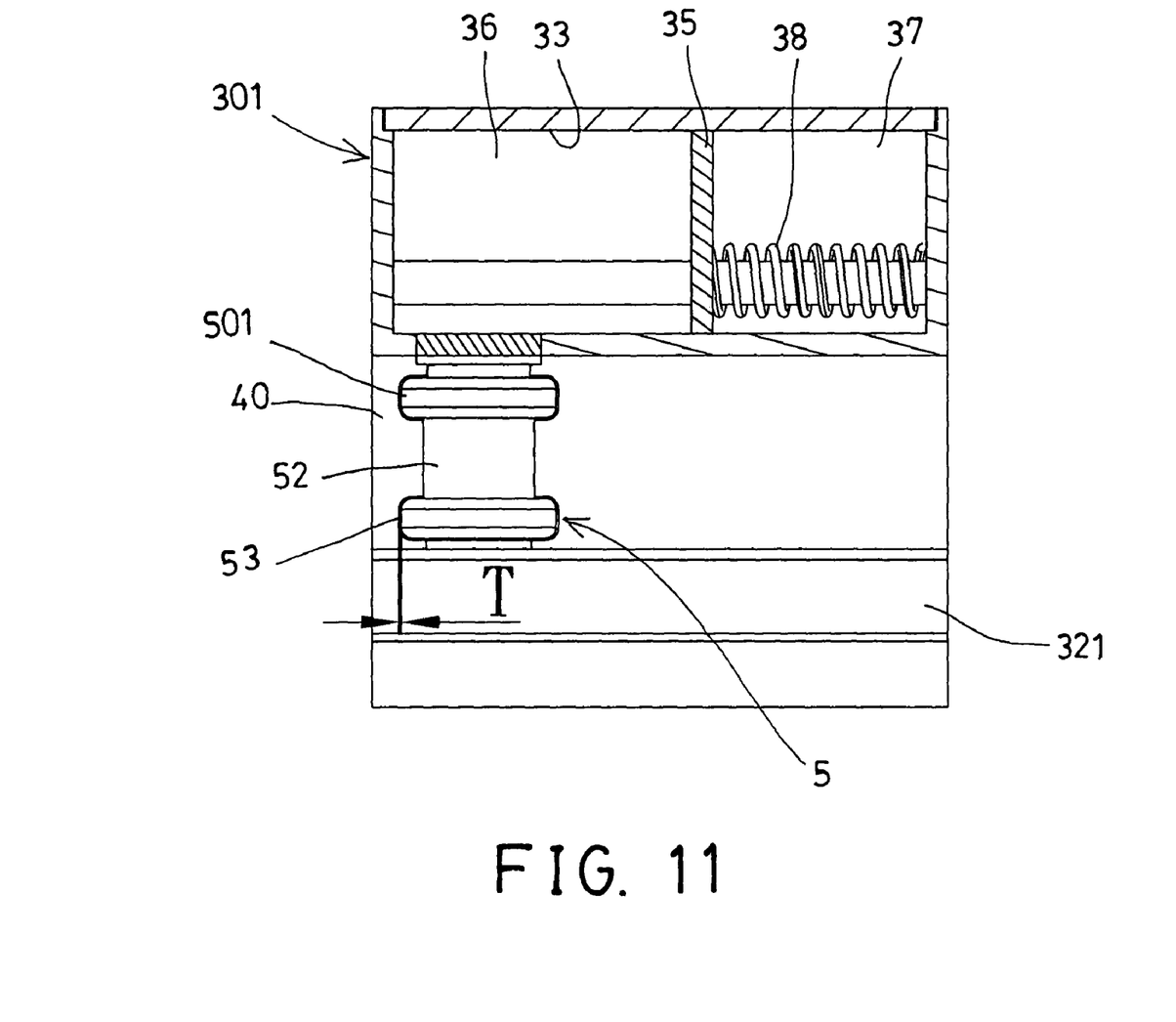
FIG. 11 is an enlarged partial cross sectional view of the motion guide apparatus as shown in FIGS. 8-10.
Figure 12:
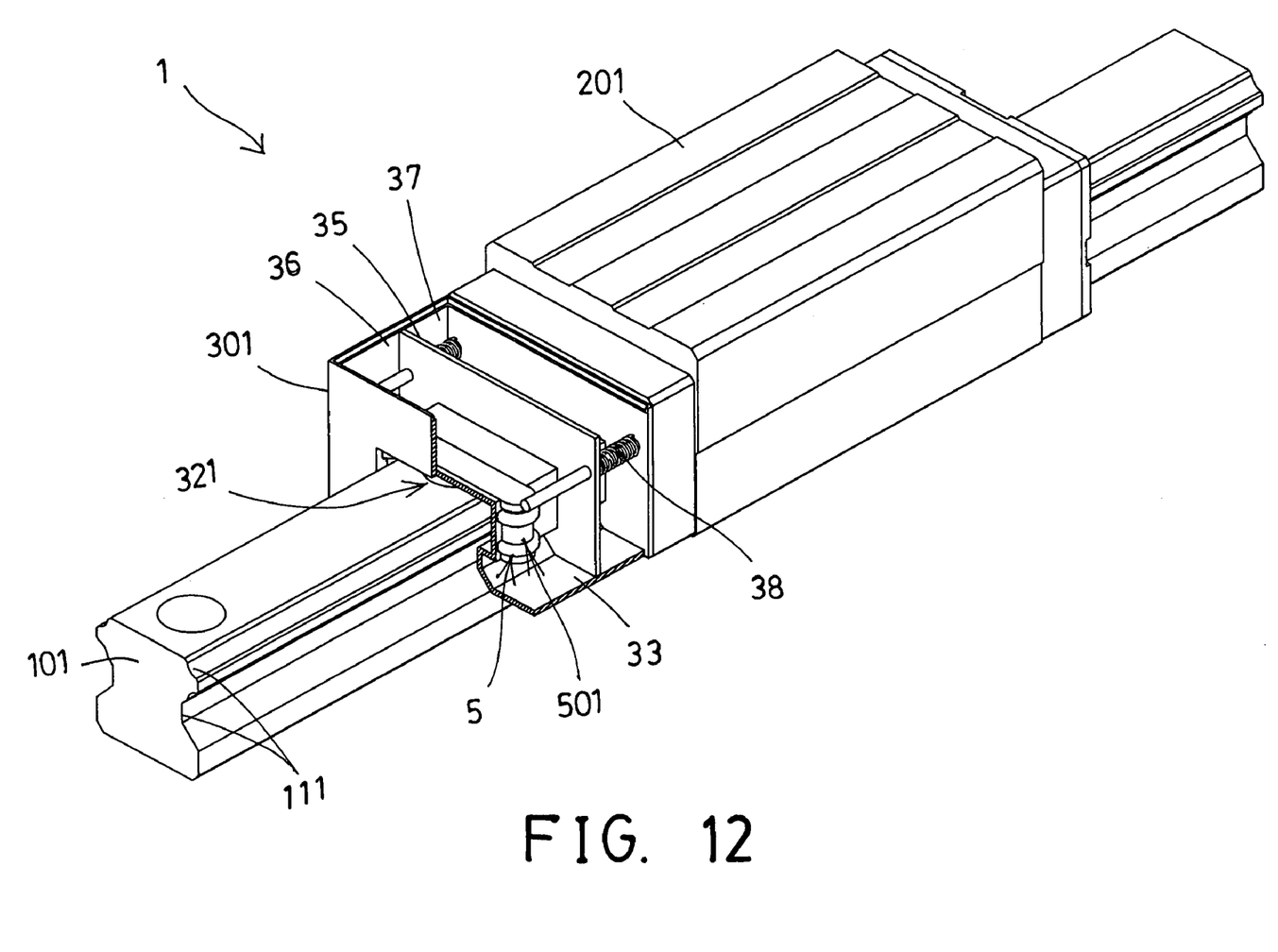
FIG. 12 is another partial perspective view of the motion guide apparatus as shown in FIGS. 8-11.
Figures 13, 14:
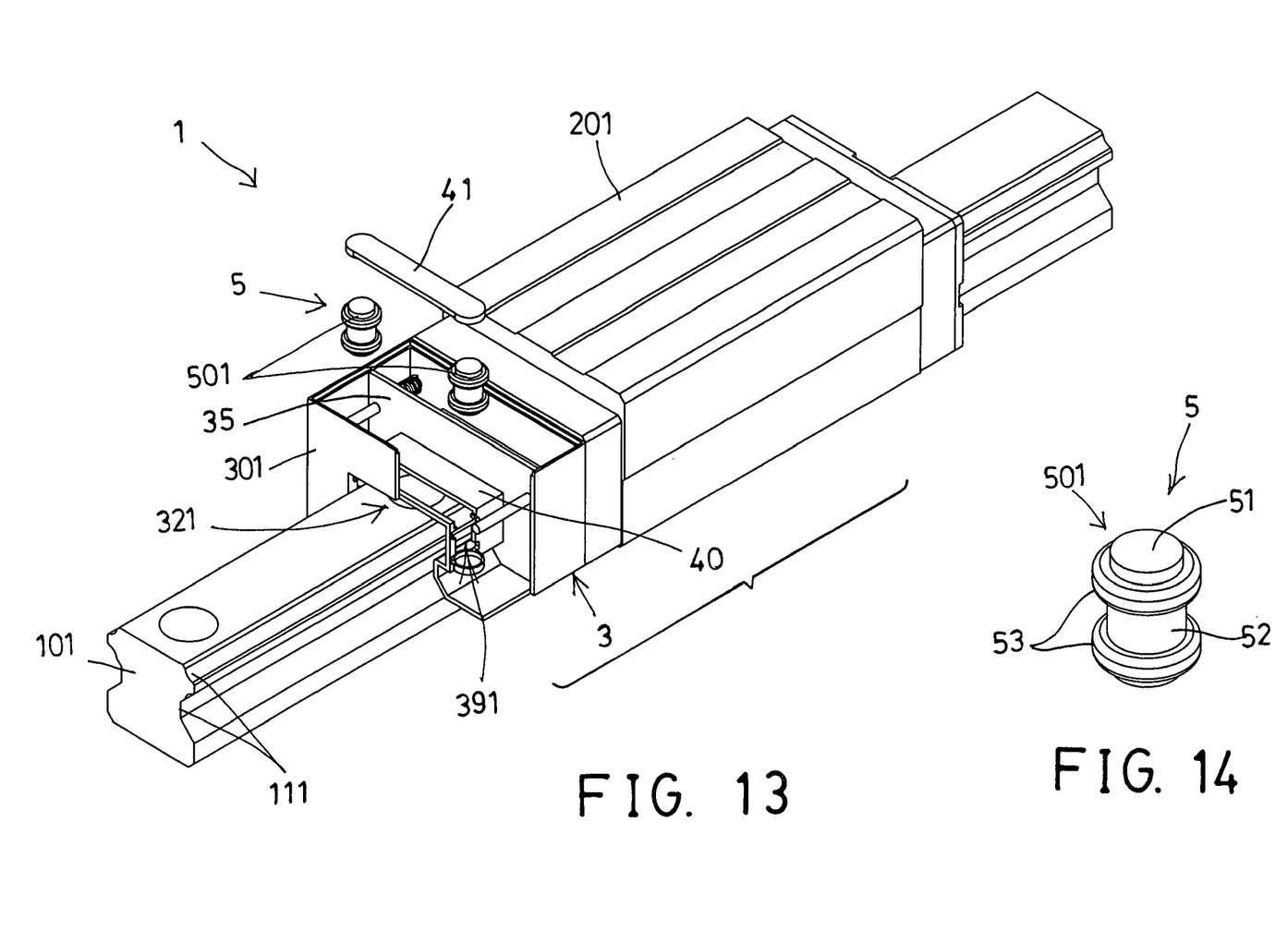
FIG. 13 is a partial exploded view of the motion guide apparatus as shown in FIGS. 8-12.
FIG. 14 is a perspective view illustrating the oil applying member of the motion guide apparatus as shown in FIGS. 8-13.

As shown in FIGS. 9, 11, 13, the outer diameter of the engaging rim 53 of the oil applying member 50 is also arranged for slightly spacing from the seat 40 and/or the cover 41 of the housing 301 and for forming a slit "T" (FIG. 11) between the seat 40 and/or the cover 41 of the housing 301 and the engaging rim 53 of the oil applying member 501 and thus for allowing the lubricating grease or oil 80 to be carried and applied or distributed through the slit "T" that is formed between the seat 40 and/or the cover 41 of the housing 301 and the engaging rim 53 of the oil applying member 501 and thus for allowing the lubricating grease or oil 80 to be carried and applied or distributed through the passage 391 of the housing 301 and then filled or applied into the grooves 111 of the elongated shaft 101.

The housing 301 also includes a partition or plunger 35 slidably received or engaged in the space 33 of the housing 301 for separating the inner space 33 of the housing 301 into a compressing chamber 36 and a compartment 37, in which the chamber 36 of the housing 301 is also provided for receiving the lubricating grease or oil 80, and one or more spring members 38 may further be provided and engaged with the plunger 35 for biasing or forcing the plunger 35 to force the lubricating grease or oil 80 through the passage 391 of the housing 301 and then into the grooves 111 of the elongated shaft 101.

Accordingly, the motion guide apparatus in accordance with the present invention includes two movable members movable relative to each other, and a lubricating device easily attached to one of the two movable members for applying a lubricating grease or oil onto the other movable member and for suitably lubricating the movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A motion guide apparatus comprising:
   an elongated shaft including a groove formed on an outer peripheral surface thereof,
   a movable member movably attached onto said elongated shaft, and including a screw hole formed therein for receiving said elongated shaft,
   a housing attached to said movable member and moved in concert with said movable member, and including a cylindrical barrel having a bore formed therein for receiving said elongated shaft, and including a space formed between said housing and said barrel for receiving a lubricating oil, and including a passage formed in said barrel and communicative with said bore of said barrel and said space of said housing for allowing the lubricating oil to flow from said space into said bore of said barrel and then into said groove of said elongated shaft,
   a plunger slidably received and engaged in said space of said housing for separating said space of said housing into a compressing chamber and a compartment and for forcing the lubricating oil that is received in said compressing chamber of said housing to flow through said passage of said housing, and
   an oil applying member rotatably engaged in said passage of said housing and rotatable relative to said housing to carry and to apply the lubricating oil through said passage of said housing, and said oil applying member including an engaging rim directed toward said groove of said elongated shaft for carrying and applying the lubricating oil into said groove of said elongated shaft, and including a wheel rim having an outer diameter arranged for engaging with said outer peripheral surface of said elongated shaft and for allowing said oil applying member to be forced to rotate relative to said housing by said elongated shaft.

2. The motion guide apparatus as claimed in claim 1, wherein said housing includes an orifice formed therein, and said oil applying member includes an axle rotatably received and engaged in said orifice of said housing.

3. The motion guide apparatus as claimed in claim 1, wherein said housing includes a cover secured to said housing and having an opening formed in said cover and aligned with said passage of said housing for rotatably receiving and engaging with said oil applying member.

4. The motion guide apparatus as claimed in claim 1, wherein said engaging rim of said oil applying member includes an outer diameter greater than that of said wheel rim for engaging into said groove of said elongated shaft and for carrying and applying the lubricating oil into said groove of said elongated shaft.

5. The motion guide apparatus as claimed in claim 1, wherein said housing includes at least one pole disposed and mounted in said space of said housing, and said plunger is slidably attached onto said at least one pole.

6. The motion guide apparatus as claimed in claim 1, wherein said housing includes at least one spring member engaged with said plunger for biasing and forcing said plunger to force the lubricating oil into said passage of said housing.

* * * * *